United States Patent [19]

Erlandson

[11] Patent Number: 5,692,341

[45] Date of Patent: Dec. 2, 1997

[54] WALL PANEL SUPPORT MEMBER AND METHOD OF USE

[75] Inventor: Fred G. Erlandson, Colorado Springs, Colo.

[73] Assignee: FGE Backerboard Co., Colorado Springs, Colo.

[21] Appl. No.: 602,629

[22] Filed: Feb. 16, 1996

Related U.S. Application Data

[63] Continuation-in-part of Ser. No. 397,832, Mar. 2, 1995, abandoned.

[51] Int. Cl.$^6$ .................................................... E04B 2/00
[52] U.S. Cl. .......................... 52/27; 52/36.5; 52/762; 52/764; 52/771; 52/779; 52/781; 52/781.3; 52/745.1; 312/245
[58] Field of Search .................... 52/27, 36.1, 36.4, 52/36.5, 282.1, 762, 764, 770, 771, 777, 778, 779, 781, 781.3, 745.1; 312/245; 403/3, 4, 381, 389, 230

[56] References Cited

U.S. PATENT DOCUMENTS

| | | |
|---|---|---|
| 710,022 | 9/1902 | Stevens .................................. 403/230 |
| 2,066,006 | 12/1936 | Kellogg . |
| 2,181,831 | 11/1939 | McLaughlin, Jr. . |
| 2,218,965 | 10/1940 | Young et al. . |
| 2,271,584 | 2/1942 | Fellom . |
| 2,446,323 | 8/1948 | Davis et al. . |
| 2,895,180 | 7/1959 | Byssing . |
| 2,999,278 | 9/1961 | Spencer et al. .................... 52/781.3 X |
| 3,490,797 | 1/1970 | Platte . |
| 3,753,325 | 8/1973 | Stanley et al. . |
| 3,826,055 | 7/1974 | Bobzin et al. . |
| 3,852,927 | 12/1974 | Birum, Jr. . |
| 4,007,570 | 2/1977 | Hunter ...................................... 52/317 |
| 4,037,381 | 7/1977 | Charles . |
| 4,194,336 | 3/1980 | Weinar ................................... 52/481.1 |
| 4,408,427 | 10/1983 | Zilch . |
| 4,418,507 | 12/1983 | Roberts et al. . |
| 4,453,362 | 6/1984 | Rodgers ................................. 52/481.1 |
| 4,558,838 | 12/1985 | Klein ........................................ 52/778 X |
| 4,608,801 | 9/1986 | Green et al. ....................... 52/781.3 X |

FOREIGN PATENT DOCUMENTS

| | | |
|---|---|---|
| 1079024 | 6/1980 | Canada . |
| 2451486 | 11/1980 | France . |
| 199411 | 6/1908 | Germany . |
| 387898 | 5/1965 | Switzerland ............................. 403/3 |
| 7583 | 5/1889 | United Kingdom . |
| WO 89/12412 | 12/1989 | WIPO ..................................... 312/245 |

*Primary Examiner*—Wynn E. Wood
*Assistant Examiner*—Laura A. Saladino
*Attorney, Agent, or Firm*—Faegre & Benson LLP

[57] ABSTRACT

A wall panel support member adapted to reinforce a wall and to support the weight of structures such as shelves, cabinets, and sinks which are attached to a wall. The wall panel support member includes a support panel which is mounted between adjacent wall studs by brackets or other mounts. One embodiment of the invention includes a support panel with a groove formed at one end of the support panel which accommodates a lip of a metal stud, thus allowing the surface of the support panel to engage the stud. A bracket which is comprised of a plurality of generally perpendicular angled surfaces is mounted on the opposite end of the support panel from the groove for securing the wall panel support member to an adjacent stud. The bracket includes slots in the surface mounted to the support panel to allow the position of the bracket to be adjusted along the longitudinal axis of the support panel in order to accommodate variations in width between studs.

16 Claims, 4 Drawing Sheets

WALL PANEL SUPPORT MEMBER AND METHOD OF USE

REFERENCE TO RELATED APPLICATION

This application is a continuation-in-part of application Ser. No. 08/397,832 filed Mar. 2, 1995, and entitled "BACKERBOARD," now abandoned.

BACKGROUND OF THE INVENTION

1. Field of the Invention

The present invention relates to wall panel members and methods for constructing building wall panels.

2. Description of the Prior Art

The use of shelves, cabinets, sinks, and other structures is commonplace in today's society. Oftentimes, these structures are not supported by the floor of a room, but are instead mounted directly to a wall. Such structures are often attached to load bearing members in the wall in order to support the weight of these structures as the sheet rock wall panels cannot support the load. Wall studs are one example of load bearing members that are used to support such structures. However, sometimes the structures are to be mounted between stud locations, and thus additional support members can be used to suspend the structures. Traditionally, when constructing the portion of a wall where one of these structures will be located, a carpenter measures the length and width of the structure, and cuts additional members to match these dimensions from construction timbers such as two-by-fours. The carpenter then "frames" the area for the structure by attaching these members to adjacent wall studs and to each other at the appropriate height. Wall panels are then mounted on the studs to complete the construction of the wall, and the structure is mounted to these additional interior members with conventional fasteners such as nails or screws which pass through the wall panels and into the additional members. In this manner, the structure is attached to load bearing members in areas of the wall where studs are not located.

This traditional method of hanging structures between studs on a wall, however, is inefficient in that the process is complicated, time consuming, and wasteful due to the creation of unusable portions of timbers when the additional members are cut. There remains, therefore, a continuing need for improved wall panel construction members and methods of use for reinforcing wall panels where structures are to be supported. An uncomplicated, strong, not wasteful, easy to use wall panel and method of use is thus preferred.

SUMMARY OF THE INVENTION

The present invention is a wall panel support member adapted to be mounted between first and second adjacent studs in a wall. The wall panel support member comprises a support panel having a generally planar surface and first and second ends with a first axis extending longitudinally along the panel between the first and second ends. At least one mounting means for securing the panel to a stud at one end of the support panel is adjustable along the longitudinal axis of the support panel to accommodate variations in width between the first and second studs.

The support panel can be formed from a fire resistant or fire retardant material, such as a treated wood-based product. In one embodiment of the invention, the mounting means is a bracket mounted on the second end of the support panel for securing the wall panel support member to the second stud. The support panel further includes a groove on a first side and at the first end of the support panel for accommodating a lip in the first stud. The groove is generally perpendicular to the longitudinal axis and is offset from the first end of the panel. The bracket comprises a plurality of angled surfaces for attachment to the support panel and to the stud.

In another embodiment of the invention, the wall panel support member includes first and second mounting means which are brackets mounted on a first side of the support panel at the longitudinally opposing ends. Each bracket comprises a plurality of angled surfaces for attachment to the support panel and to the first and second studs.

DETAILED DESCRIPTION OF THE PREFERRED EMBODIMENTS

Figure 1:
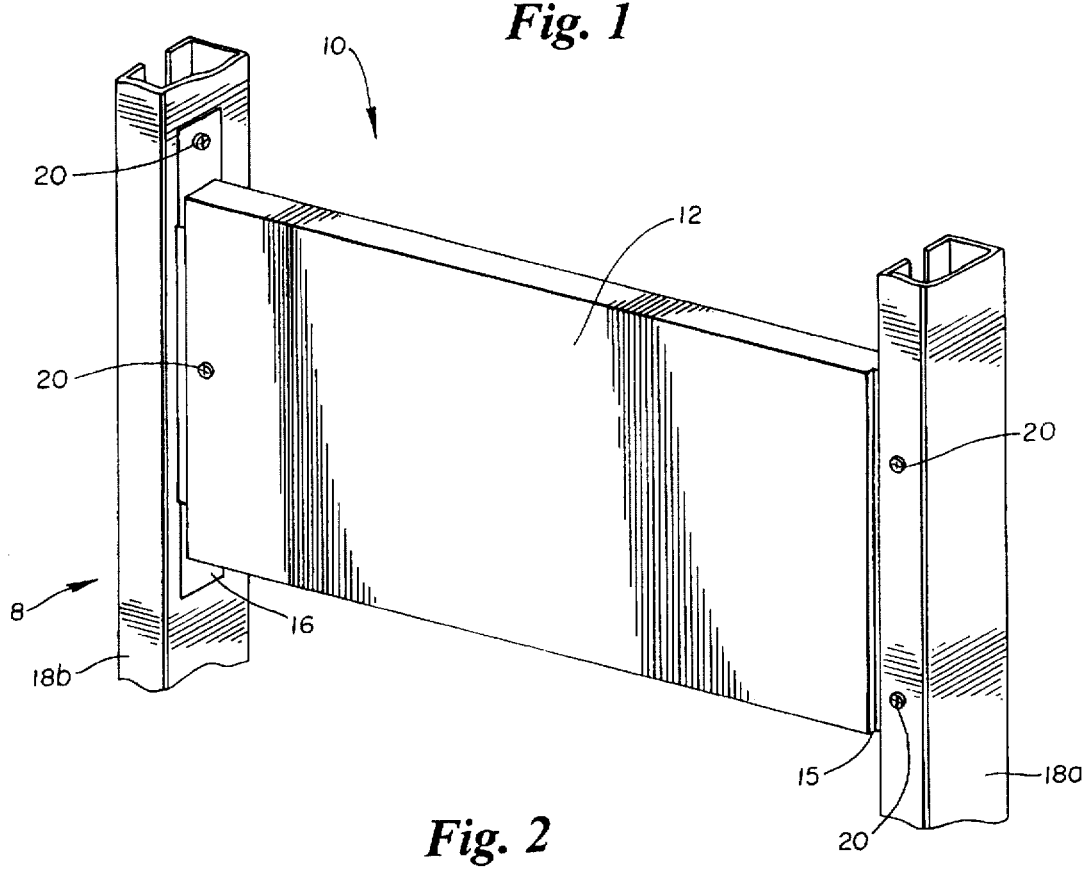
FIG. 1 is an illustration of a wall under construction which includes a wall panel support member in accordance with the present invention.
Figure 2:
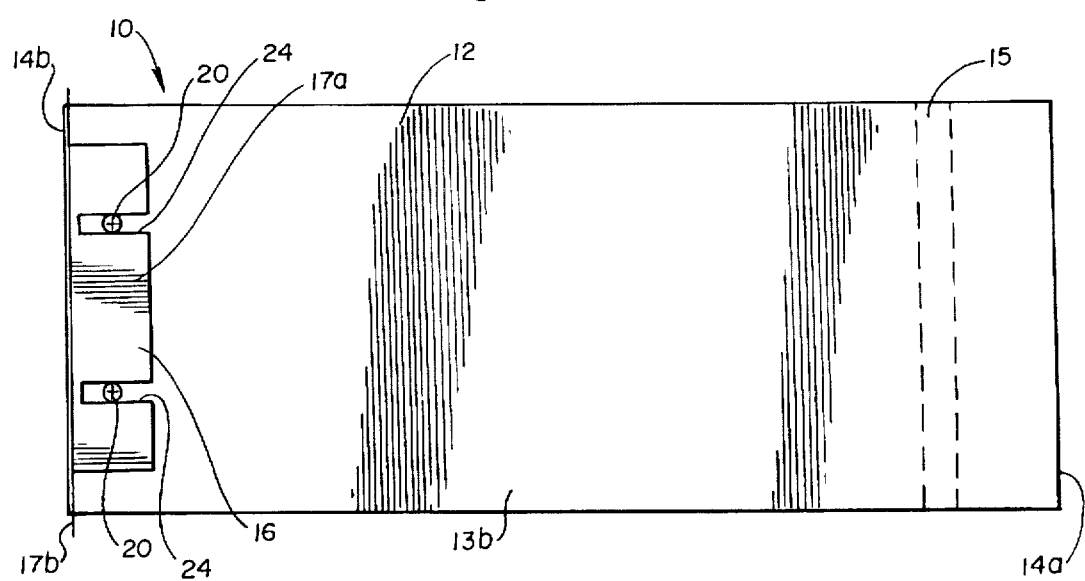
FIG. 2 is a side view of the wall panel support member shown in FIG. 1.
Figure 3:
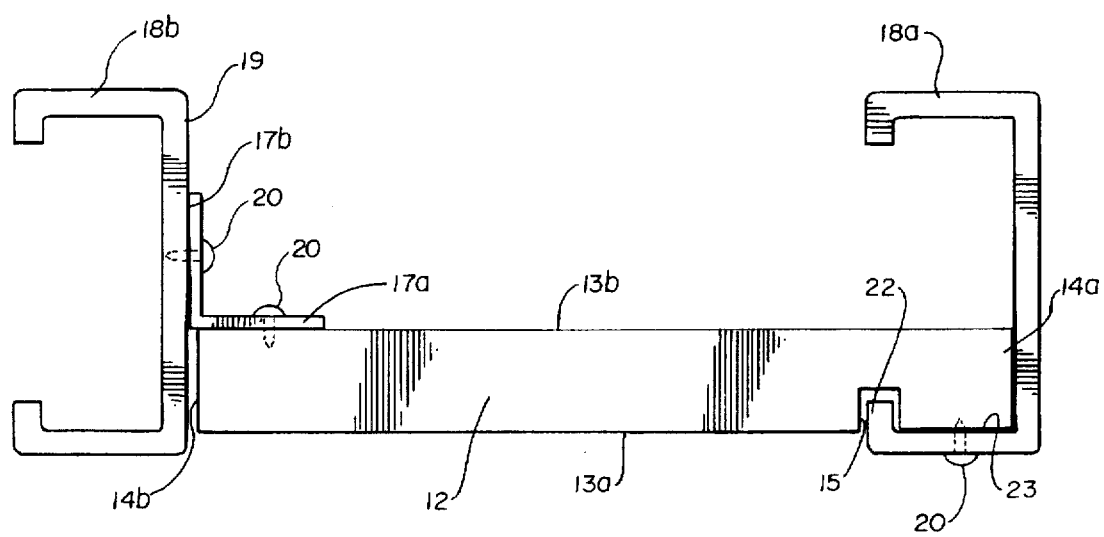
FIG. 3 is a top view of the wall panel support member shown in FIG. 1.

An uncompleted wall 8 which includes first and second studs 18a and 18b, respectively, and a wall panel support member 10 in accordance with the present invention is shown generally in FIGS. 1–3. Wall panel support member 10 includes support panel 12 and mounting means, such as bracket 16. Wall panel support member 10 is adapted to reinforce wall 8 and to support the weight of structures such as shelves, cabinets, and sinks which are attached to wall 8. Bracket 16 is mounted on support panel 12 and is fixedly secured to second stud 18b. Fasteners 20 can be used to secure wall panel support member 10 to first and second studs 18a and 18b, and can be of any known, conventional design such as nails or screws.

Support panel 12 further includes first and second sides 13a and 13b, respectively, and can be formed out of a fire retardant or fire-resistance-treated material, such as plywood, particle board, waferboard, or other wood-based products. Other materials which possess the required attributes can also be used to form support panel 12, however. In preferred embodiments, support panel 12 ranges in thickness from one-half inch to three-quarters inch, although other thicknesses of materials are equally suitable for use.

In the embodiment shown in FIGS. 1–3, wall panel support member 10 is adapted to be used with conventional metal studs having a generally "U"-shaped cross section with lips 22. Groove 15 is formed generally perpendicular to the longitudinal axis of support panel 12 on first side 13a of the support panel 12, and can be formed approximately one inch from a first end 14a. The depth of groove 15 can vary between one-quarter inch and one-half inch, depending on the thickness of support panel 12 stud and the length of the lip 22 it must accommodate. Groove 15 engages a lip 22 of first metal stud 18a, thus enabling first side 13a of the support panel 12 to engage an interior surface 23 of first stud 18a. Support panel 12 can be fixedly secured to first stud 18a with at least one screw or other fastener 20.

Bracket 16 is mounted on second side 13b at second end 14b of support panel 12. In the embodiment shown, bracket 16 includes first surface 17a mounted by screws or other fasteners 20 to second side 13b of panel 12, and second surface 17b which is generally perpendicular to first surface 17a and extends away from second side 13b for engaging second metal stud 18b. First surface 17a of bracket 16 includes a plurality of fastener-receiving slots 24, for enabling adjustment of the position of bracket 16 along the longitudinal axis of support panel 12 in order to engage second surface 17b of bracket 16 to lateral side 19 of second stud 18b. In this manner, variations in width between first and second studs 18a and 18b are accommodated. Second surface 17b of bracket 16 can be fixedly secured to lateral side 19 of second stud 18b with at least one fastener 20.

Figure 4:
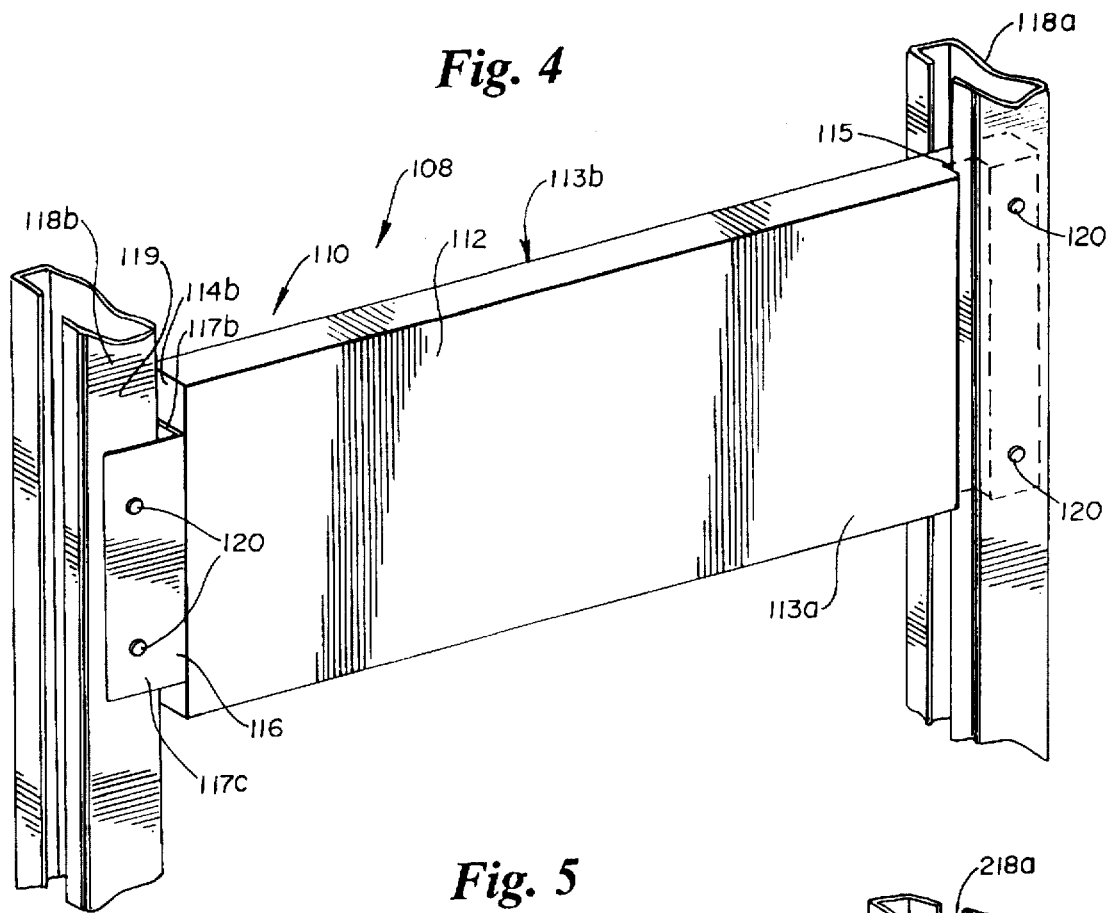
FIG. 4 is an illustration of a wall under construction which includes a wall panel support member in accordance with a second embodiment of the present invention.

FIG. 4 depicts a second embodiment of the present invention, a wall panel support member 110 being used in constructing a wall 108. This embodiment is also adapted to be used with metal studs, and the support panel 112 and groove 115 can be identical to those described above and shown in FIGS. 1–3. Bracket 116 is mounted on second side 113b and at longitudinally opposing second end 114b of support panel 112. Bracket 116 includes a first surface (not shown but mounted on second side 113b) which can be identical to first surface 17a described above and shown in FIGS. 2 and 3. Bracket 116 further includes second surface 117b generally perpendicular to the first surface of bracket 116 and extending over second end 114b and toward first side 113a of support panel 112. Third surface 117c of bracket 116 is generally perpendicular to second surface 117b and generally parallel to the first surface of bracket 116. Third surface 117c engages a lateral surface 119 of second stud 118b, and can be fixedly secured to surface 119 with at least one fastener 120.

Figure 5:
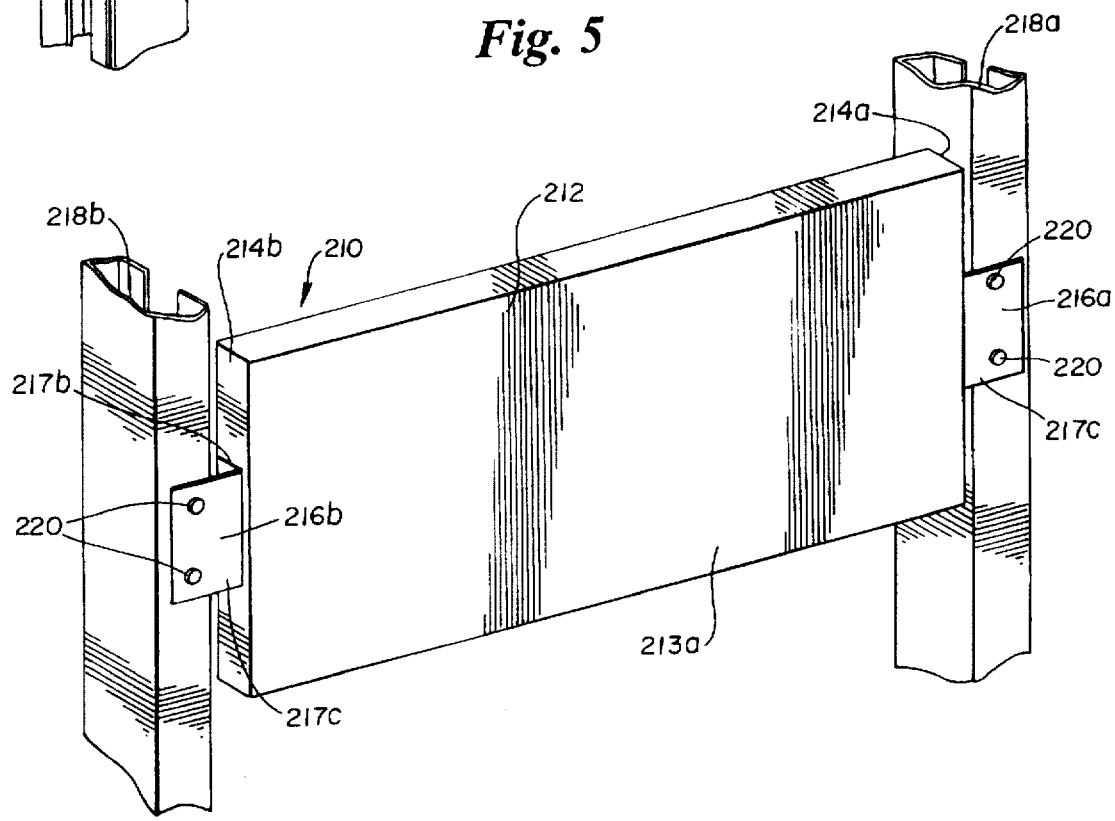
FIG. 5 is an illustration of a wall under construction which includes a wall panel support member in accordance with a third embodiment of the present invention.
Figure 6:
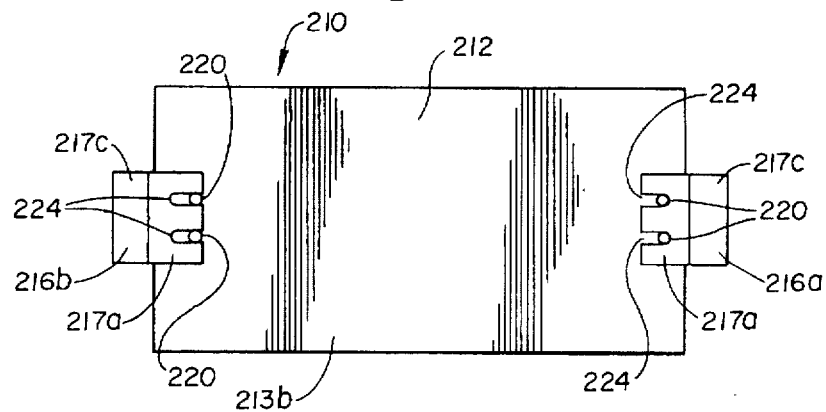
FIG. 6 is a side view of the wall panel support member shown in FIG. 5.

A third embodiment of the present invention, wall panel support member 210, is shown in FIGS. 5–6. This embodiment is adapted to be used with studs that do not have lips, such as wood-based two-by-fours. Wall panel support member 210 includes support panel 212 which can be identical to support panels 12 and 112 described above and shown in FIGS. 1–4. Support panel 212 includes first and second brackets 216a and 216b, both of which are mounted on second side 213b but are mounted at the first and second ends 214a and 214b, respectively, of support panel 212. First and second brackets 216a and 216b are fixedly secured to first and second studs 218a and 218b, respectively, to support the wall panel support member 210. First and second brackets 216a and 216b can be identical to bracket 116 described above and shown in FIG. 4, including first, second, and third angled surfaces 217a, 217b, and 217c, respectively, and slots 224. Brackets 216a and 216b can therefore be adjusted along the longitudinal axis of the support panel 212. Those skilled in the art will recognize that a bracket configuration with only two angled surfaces and similar to bracket 16 described above and shown in FIGS. 1–3 could also be utilized in this embodiment of the present invention.

Figure 7:
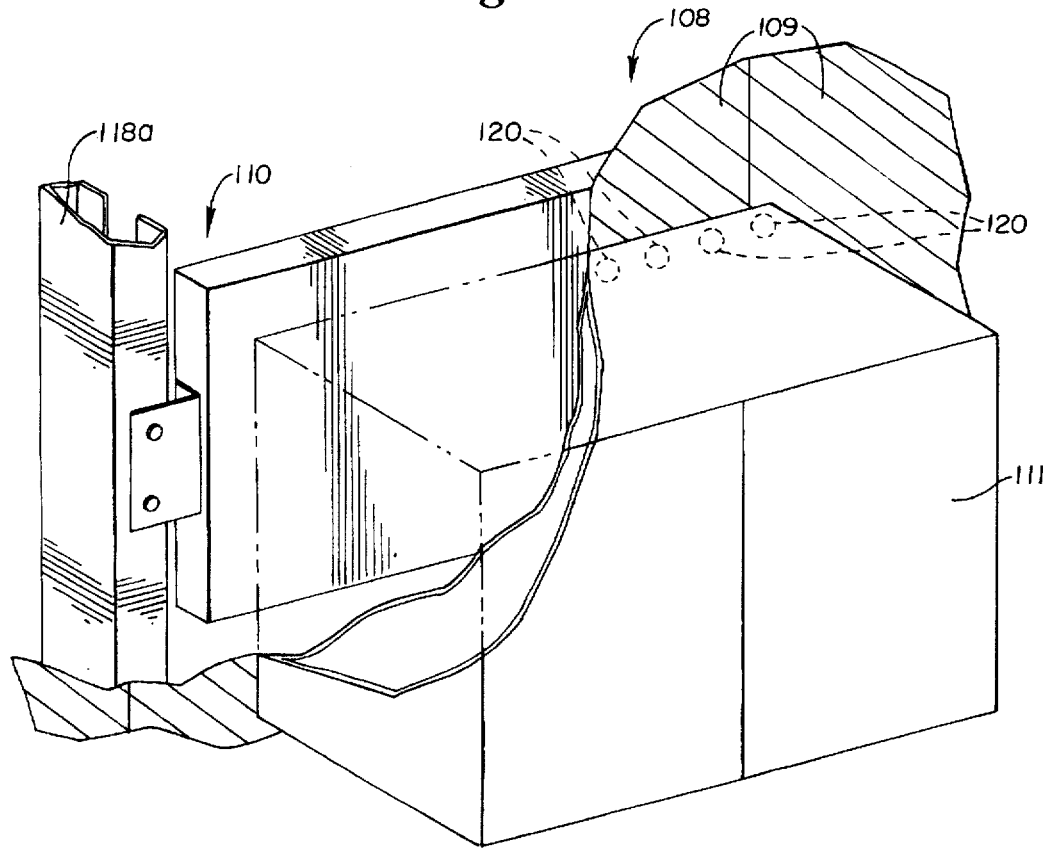
FIG. 7 is an cutaway illustration of a wall including one embodiment of the present invention, a wall panel, and a structure attached to the wall panel and wall panel support member.

A method of use for the present invention is depicted generally in FIG. 7. Wall 108 includes wall panels 109, such as sheet rock, a wall panel support member 110 in accordance with the present invention, and a structure such as cabinet 111 attached to wall panels 109 and wall panel support member 110. Wall panel support member 110 is fixedly attached to a first stud 118a and a second stud (not shown), and wall panels 109 are then secured to the first and second studs over wall panel support member 110. Cabinet 111 can then be fixedly attached to the wall 108 with at least one fastener 120 which passes through the wall panels 109 and into the wall panel support member 110. In this manner, wall 108 is reinforced and the weight of the cabinet 111 is supported by wall panel support member 110.

As described above and shown in FIGS. 1–7, the present invention presents a unique and effective solution to the problems associated with reinforcing walls and supporting structures attached to walls. The invention provides a uniform, durable, strong support panel that is quickly and efficiently attached to studs for supporting the weight of sinks, cabinets, shelves, and other structures. The invention is adaptable to varying widths between studs, and is cost effective in that no construction materials are wasted in reinforcing walls to support such structures.

Although the present invention has been described with reference to preferred embodiments, those skilled in the art will recognize that changes may be made in form and detail without departing from the spirit and scope of the invention.

What is claimed is:

1. A wall panel support member adapted to be mounted between first and second adjacent studs comprising:

a rigid support panel having a generally planar surface and first and second opposite ends, sized to extend substantially between and adapted to be mounted to the first and second studs, with a first axis extending longitudinally along the support panel between the first and second ends, for reinforcing a wall;

a bracket at a second end of the support panel for securing the wall panel support member to the second stud;

adjustable mounting means for mounting the bracket to the second end of the support panel and enabling adjustment of the position of the bracket along the longitudinal axis of the rigid support panel to accommodate variations in width between the first and second studs; and a groove on a first side and at the first end of the support panel for engaging a lip on the first stud, wherein the groove is generally perpendicular to the longitudinal axis of the support panel and offset from the first end of the panel.

2. The wall panel support member of claim 1 wherein the support panel is formed from a fire resistant or retardant material.

3. The wall panel support member of claim 2 wherein the support panel is formed from a wood-based product.

4. A method of using the wall panel support member of claim 1 which comprises:

placing the wall panel support member between adjacent first and second studs wherein the groove on the support panel engages a lip of the first stud; fastening the support panel to the first stud with fasteners; and fastening the bracket to the second stud with fasteners.

5. The method of using the wall panel support member of claim 4 which further comprises attaching a wall panel to the studs.

6. The method of using the wall panel support member of claim 5 which further comprises mounting a structure to the wall panel adjacent to the wall panel support member, including mounting the structure to the wall panel support member.

7. A method for constructing a wall which comprises:
providing a wall panel support member having a rigid support panel that extends
substantially between adjacent first and second studs and at least one bracket at an end of the support panel, wherein the position of the bracket is adjustable along a longitudinal axis of the support panel;
placing the wall panel support member between adjacent first and second studs at a location on the wall selected for reinforcement;
mounting the support panel and bracket to adjacent first and second studs; and
mounting a wall panel to the studs.

8. The method for constructing a wall of claim 7 wherein the steps further include mounting a structure to the wall panel adjacent to the wall panel support member, including mounting the exterior structure to the wall panel support member.

9. The method for constructing a wall of claim 7 wherein the step of providing a wall panel support member includes:
forming a groove in one side of the support panel;
securing a bracket to the support panel at the longitudinally opposing end of the support panel from the groove; and
adjusting the position of the bracket along the longitudinal axis of the support panel to accommodate variations in width between the first and second studs.

10. The method for constructing a wall of claim 7 wherein the step of providing a wall panel support member includes:
securing a first bracket to the support panel at one end of the support panel;
securing a second bracket to the support panel at the longitudinally opposing end of the panel support; and
adjusting the position of the second bracket along the longitudinal axis of the support panel to accommodate variations in width between the first and second studs.

11. A wall panel support member adapted to be mounted between first and second adjacent studs comprising:
a support panel having a generally planar surface and first and second opposite ends, adapted to be mounted to the first and second studs, with a first axis extending longitudinally along the support panel between the first and second ends, for reinforcing a wall; and
at least one bracket mounted to the support panel at the first end for securing the wall panel support member to the first stud wherein the position of the bracket is adjustable along the longitudinal axis of the support panel, and wherein the bracket comprises a plurality of angled surfaces, including:
a first surface mounted on the support panel including a plurality of slots for adjusting the position of the bracket;
a second surface generally perpendicular to the first surface; and
fasteners in the slots of the first surface for securing the bracket to the support panel.

12. The wall panel support member of claim 11 wherein the second surface of the bracket extends away from the support panel for engaging the first stud.

13. The wall panel support member of claim 11 wherein the second surface of the bracket extends over the end of the support panel, the bracket further including a third surface generally perpendicular to the second surface and generally parallel to the first surface extending away from the support panel longitudinally for engaging the second stud.

14. The wall panel support member of claim 11 wherein the wall panel support member includes a second bracket mounted to the support panel at the second end for securing the wall panel support member to the second stud.

15. The wall panel support member of claim 11 wherein the wall panel support member includes a groove at the second end of the support panel for engaging a lip on the second stud, wherein the groove is generally perpendicular to the longitudinal axis of the support panel and offset from the second end of the panel at the second end.

16. A wall panel support member adapted to be mounted between first and second adjacent studs comprising:
a support panel having a generally planar surface and first and second opposite ends, adapted to be mounted to the first and second studs, with a first axis extending longitudinally along the support panel between the first and second ends, for reinforcing a wall; and
at least one bracket mounted to the support panel at the first end for securing the wall panel support member to the first stud, wherein the bracket comprises a plurality of angled surfaces, including:
a first surface mounted on the support panel;
a second surface generally perpendicular to the first surface extending over the end of the panel; and
a third surface generally perpendicular to the second surface and generally parallel to the first surface extending away from the panel longitudinally for engaging the first stud, wherein the third surface is of sufficient longitudinal length to engage the first stud as the width between the first and second studs varies.

* * * * *